(12) United States Patent
Haen et al.

(10) Patent No.: US 6,491,417 B1
(45) Date of Patent: Dec. 10, 2002

(54) NIGHT VISION CLEARANCE LIGHT

(75) Inventors: Craig S. Haen, Avon Lake; Mark A. Matko, Garfield Hts., both of OH (US)

(73) Assignee: Bendix Commercial Vehicle Systems LLC, Elyair, OH (US)

( * ) Notice: Subject to any disclaimer, the term of this patent is extended or adjusted under 35 U.S.C. 154(b) by 0 days.

(21) Appl. No.: 09/880,282

(22) Filed: Jun. 13, 2001

(51) Int. Cl.[7] .............................. B60Q 1/00; H01L 31/00
(52) U.S. Cl. .................. 362/485; 362/540; 362/545; 362/800; 362/493; 362/246; 362/234; 250/330
(58) Field of Search ................... 362/485, 545, 362/11, 540, 254, 800, 493, 246, 240, 234, 236; 250/330, 214, 353

(56) References Cited

U.S. PATENT DOCUMENTS

| | | | | |
|---|---|---|---|---|
| 2,806,941 A | * | 9/1957 | Worden | 362/485 |
| 3,692,998 A | * | 9/1972 | Adams et al. | 362/540 |
| 4,580,196 A | * | 4/1986 | Task | 362/471 |
| 4,707,595 A | | 11/1987 | Meyers | |
| 5,133,605 A | * | 7/1992 | Nakamura | 374/124 |
| 5,534,694 A | * | 7/1996 | Ball et al. | 250/330 |
| 5,685,637 A | | 11/1997 | Chapman et al. | |
| 5,763,882 A | * | 6/1998 | Klapper et al. | 250/332 |
| 5,793,308 A | | 8/1998 | Rosinski et al. | |
| 6,033,087 A | | 3/2000 | Shozo et al. | |

FOREIGN PATENT DOCUMENTS

| | | |
|---|---|---|
| DE | 4032927 | 4/1992 |
| DE | 29806638 U1 | 2/1998 |
| WO | WO 00/15462 | 3/2000 |

* cited by examiner

*Primary Examiner*—Sandra O'Shea
*Assistant Examiner*—Ronald E. DelGizzi
(74) *Attorney, Agent, or Firm*—Calfee, Halter & Griswold, LLP

(57) ABSTRACT

A night vision clearance light assembly includes a shell, an array of visible light emitting elements, and a night vision device. The visible light emitting elements are preferably LEDs mounted on a ring received in the shell. The night vision device is operatively connected to an associated night vision camera and sees through an opening in the ring and the lens. The assembly is easily mounted in a standard factory-cut clearance light housing in the exterior of a truck cab.

14 Claims, 4 Drawing Sheets

NIGHT VISION CLEARANCE LIGHT

FIELD OF THE INVENTION

The present invention pertains to an apparatus and a method for adding a night vision camera to a vehicle. More particularly, the present invention relates to a simple manner of mounting the camera in a forward facing direction in a visually pleasing way that merges into an existing illumination system without any loss of function of either the camera or the illumination system.

DISCUSSION OF THE ART

Headlights and fog lights assist a driver in seeing the road ahead but are not always adequate in illuminating potential road hazards in time for the driver to react to the presence of the hazard. Stalled vehicles, road construction, wild animals, road debris, etc. are all potential hazards that a vehicle driver must be constantly vigilant of. The high rate of speed of highway driving allows a driver only a brief time to react once a road hazard is detected and the great mass and momentum of a heavy vehicle such as a truck makes quick evasive maneuvers difficult. This problem may become exacerbated at night when visibility is reduced, even with the aid of headlights and fog lamps that illuminate the road with light in the visible spectrum. Although improvements continue to be developed to improve forward lighting, for example to make these lights even more powerful and illuminate the roadway further ahead, there are limitations to this approach, and more powerful lights can interfere with the vision of drivers of oncoming vehicles.

In recognition of this problem, various night vision aids have been developed to assist drivers in safely navigating roads. These aids include infrared cameras, which differentiate and "see" objects based on emitted thermal radiation, and light amplification devices, which collect and amplify the ambient light in an area, thus allowing a driver to see as if more actual visible light was present. The output from these night vision devices must be transmitted to the driver in a convenient manner. Often, the output is projected via a projection unit mounted on or in the dashboard, incorporated into the vehicle as a "heads up display" (HUD), or to a video monitor mounted in the vehicle.

The placement of these night vision devices on a vehicle is an important consideration. The device must be positioned so that the night vision camera, display projector, or other components of the night vision device do not obscure a field of vision of the road.

Furthermore, it is important that the device be adequately protected from the elements and located so that the view of the road is presented from substantially the same vantage point as the driver would expect to view the road. In addition, it is preferred that the night vision device be mounted so that it does not detract from the aesthetics of the vehicle.

Thus a need exists for an aesthetically pleasing mounting arrangement for a night vision device that conforms to the vehicle and does not interfere with the field of view of the road in a simple, economical manner without sacrificing performance specifications.

BRIEF SUMMARY OF THE INVENTION

The present invention provides a night vision clearance light assembly suitable for use in trucks that advantageously combines a clearance light and a night vision device within a factory provided opening formed in the cab of the truck.

In an exemplary embodiment, the night vision clearance light assembly includes a visible light source having an opening that accommodates a night vision device. The visible light source is preferably a plurality of light emitting diodes (LEDs) or incandescent lamps arranged about an opening through which the night vision camera (for example, a window that operatively communicates with the camera) views the road. The camera of the night vision device detects low light or the infrared spectrum, or may be any other commercially available night vision device.

The annular light source is fitted with a front lens and potted to fit into a pre-existing factory cut opening so that the combined assembly is simply mounted in an aesthetically pleasing manner.

An exemplary method for converting a standard clearance light to a dual function clearance light and night vision device includes the steps of replacing the conventional light source with an annular light source having an opening, covering the annular light source with a lens, and mounting a component of a night vision device to look through the central opening of the light source.

One advantage of the present invention is the provision of a night vision clearance light assembly containing a visible light source and a night vision device that conforms to a pre-existing opening in a truck cab.

Another advantage of the present invention relates to providing a convenient mounting place for a night vision device without sacrificing the visible light that a standard clearance light provides.

Still another advantage resides in the dual function provided by the night vision clearance light.

Yet another advantage of the invention pertains to providing a night vision camera a clear view of the road ahead from a perspective that closely approximates that of the driver.

Still other benefits and advantages of the invention will become more apparent upon a reading and understanding of the following detailed description.

DETAILED DESCRIPTION OF THE INVENTION

Figure 1:
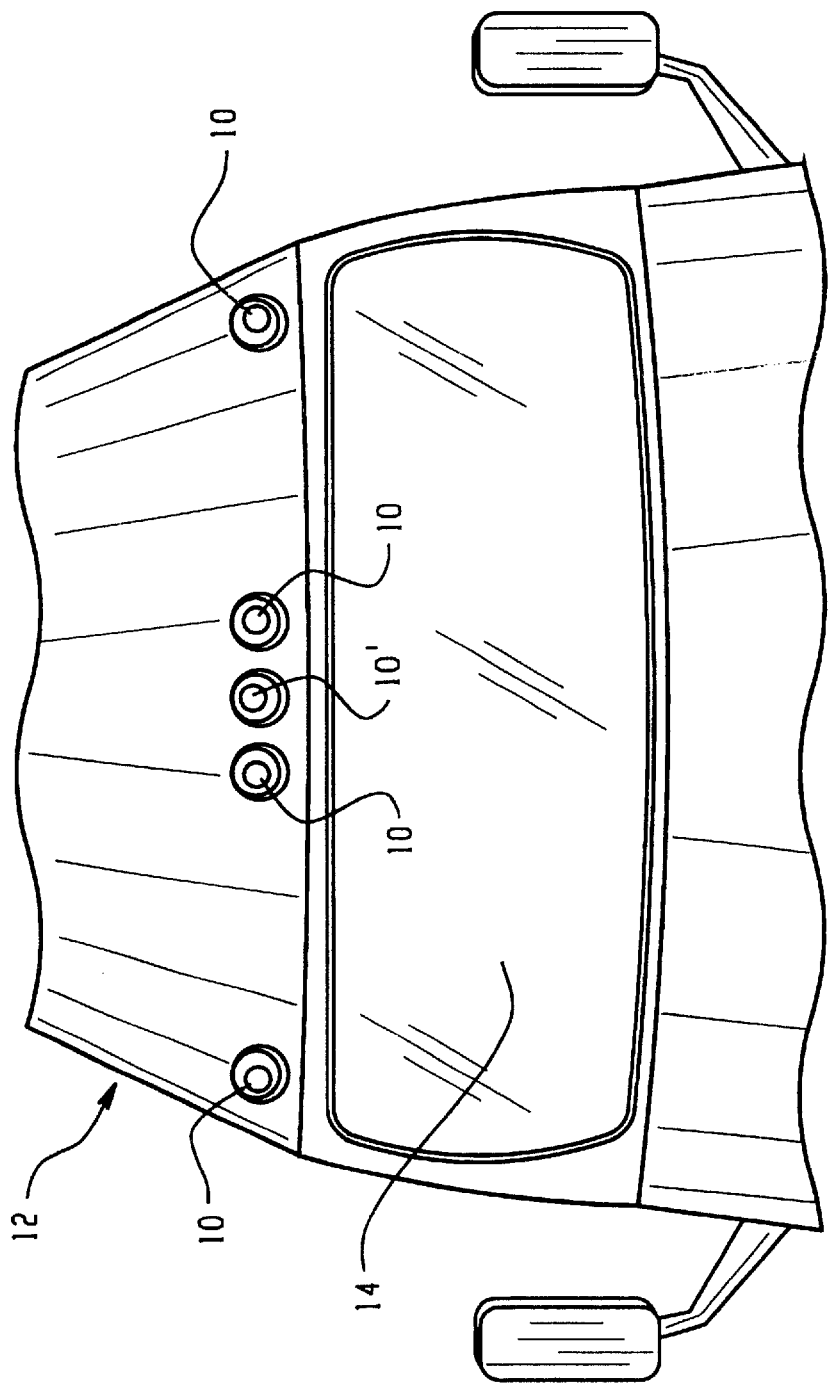
FIG. 1 is a view of a truck cab incorporating the night vision clearance light assembly of the present invention.

In many states, heavy vehicles such as trucks are required by law to have clearance lights on the cab of the truck. Typically, and as illustrated in FIG. 1, five clearance lights 10 are required in working condition on a truck cab 12 and are located in spaced relation on the front of the cab above the windshield 14. Conventional clearance lights are either incandescent or light emitting discharge (LED) lamps mounted in lamp housings that are located in factory-cut openings in the cab.

In accordance with the present invention, it was determined that these pre-cut openings in the truck cab would be an ideal location for mounting a night vision device. Unfortunately, as mentioned previously, one difficulty is that all clearance lights are required to function. Thus, while it would seemingly be a relatively simple matter to install such a device in one of these factory cut openings by removing the existing conventional clearance light and replacing it with a night vision device, a different approach is necessary in order to accommodate both a visible clearance light and the night vision device.

A unique, simple, and effective solution is provided by the present invention. Particularly, a conventional clearance light 10 is modified to form a night vision clearance light assembly 10'. A conventional housing is a two part assembly including a backing plate or base (not shown) that can also serve as a reflective surface to direct light outwardly through an enclosing shell or lens. The shell is usually a plastic molded component having a diffusing surface such as individual lenticules, prisms, or a rough inner surface that serves to diffuse the light as it is directed outwardly from the housing.

Figure 2:
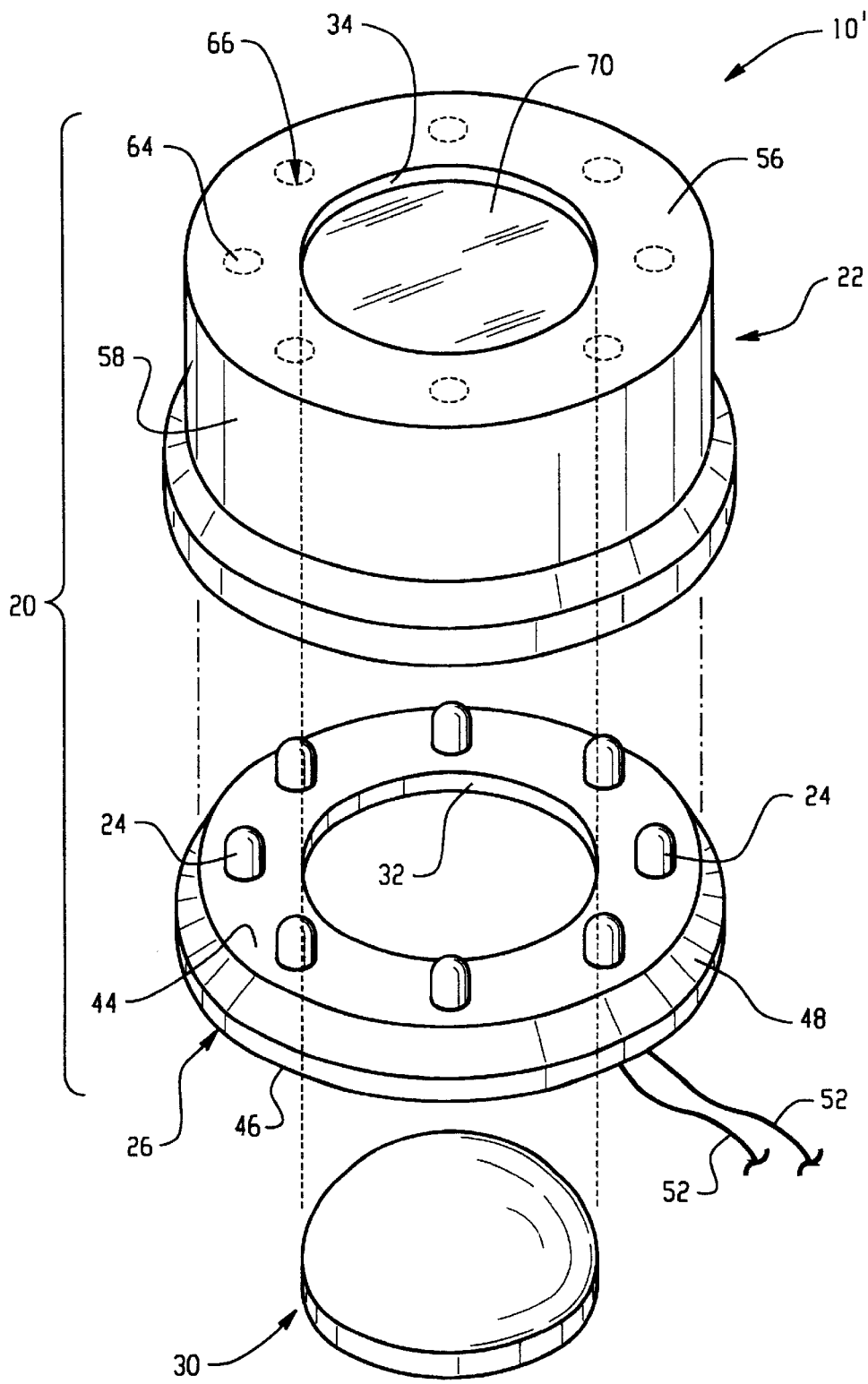
FIG. 2 is an exploded view of the night vision clearance light assembly of FIG. 1.

As shown in FIG. 2, the night vision clearance light assembly 10' includes a light assembly or illumination system 20 having an annular protective shell or lens 22, a light source such as an array of visible light emitting elements 24 mounted on a ring 26, and a night vision device, represented as a camera lens 30, that communicates with a camera (not shown). This arrangement allows the night vision device to see through aligned openings 32, 34 defined through the shell 22 and the mounting ring 26, respectively.

Figure 3:
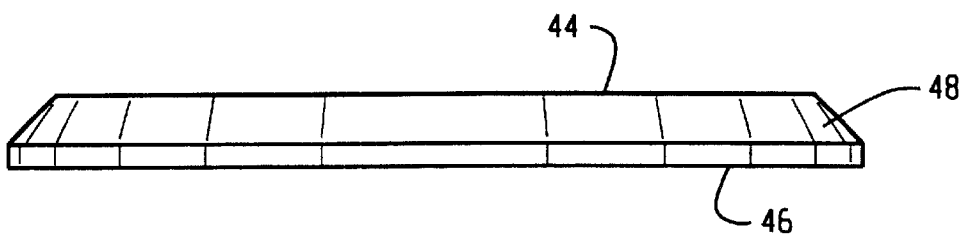
FIG. 3 is an elevational view of a mounting ring component of the light assembly.
Figure 4:
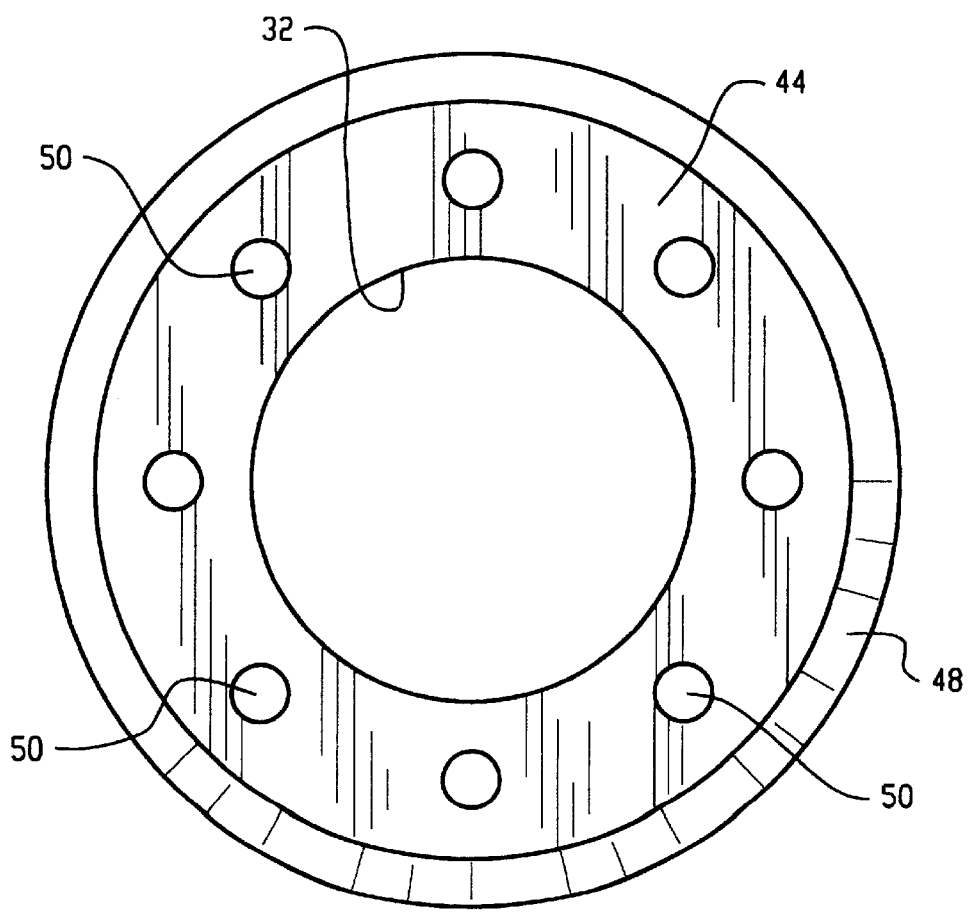
FIG. 4 is a top view of the mounting ring.

As further illustrated in FIGS. 3 and 4, the mounting ring 26 has a first or substantially planar surface 44 and a second or substantially planar surface 46. The first and second surfaces are interconnected by a sidewall 48, which in the preferred embodiment has a tapered conformation. In addition to the opening 32 (which is preferably a centralized, circular opening), the mounting ring has a plurality of smaller openings 50 circumferentially spaced about the ring and extending through the ring from the first surface to the second surface. The openings 50 are dimensioned to closely receive the LEDs so that the mounting ring holds the LEDs in a desired spacing, shown here as being equally spaced. The LEDs are secured in the mounting openings 28 in any conventional manner, for example, by adhesively securing the LEDs in the mounting ring openings. The light elements are electrically connected to each other via conventional means, such as insulated conducting wire 52, whereby the LEDs are illuminated when powered by an external source (not shown). Preferably, the combined lumen output of the LEDs is substantially identical to a conventional clearance light so that the present invention meets required legal standards.

Figure 5:
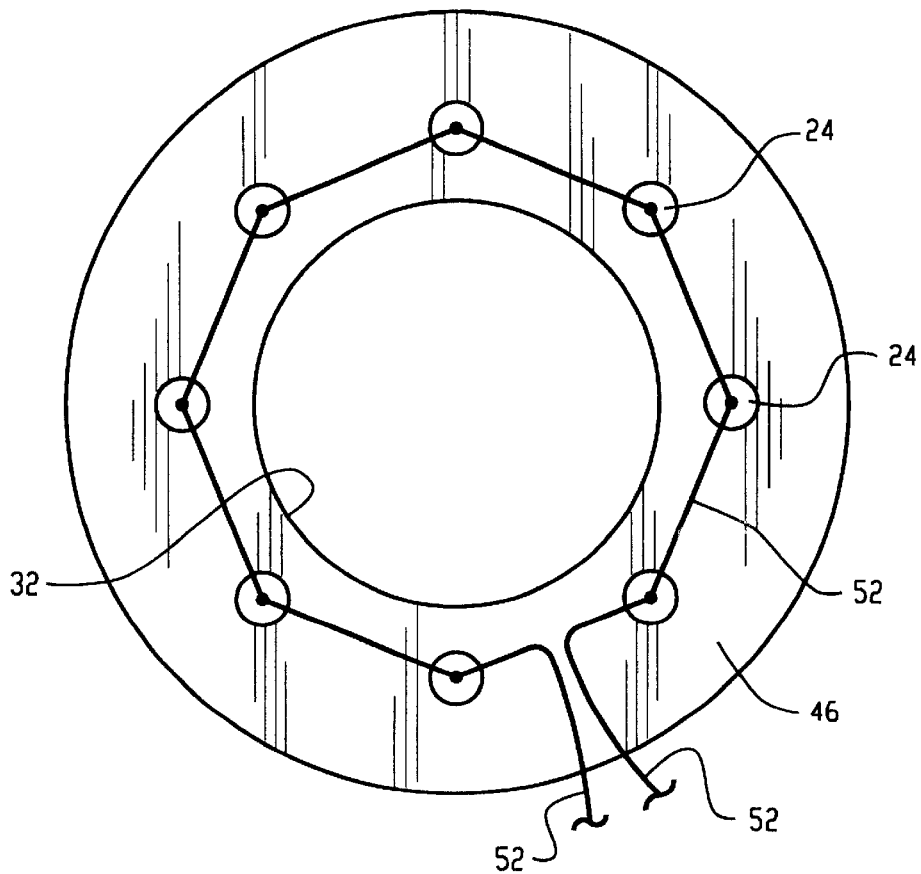
FIG. 5 is a bottom view of the mounting ring with light emitting elements inserted in openings in the ring and conducting wires connecting the light elements to each other.
Figure 6:
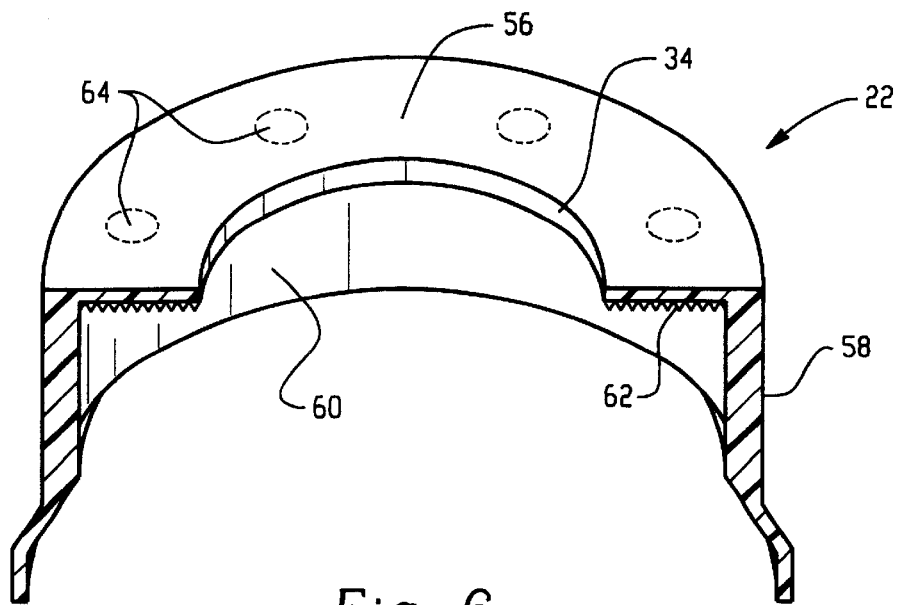
FIG. 6 is a sectional view of a modified protective lens component in accordance with the present invention.

In a preferred embodiment, the shell 22 (FIGS. 2, 5 and 6) is an openend cap having a substantially planar or slightly rounded annular surface 56 and a sidewall 58 extending outwardly therefrom. The central opening 34 in the shell is approximately equal in diameter to the central opening 32 in the mounting ring so that a desired amount of ambient light can enter through the aligned openings and reach the camera lens associated with the night vision device. An inner wall 60 of the shell annular surface may include a diffuser 62 such as lenticules, prisms, or a rough inner surface such as used in the shell of a conventional clearance light assembly. However, it is preferred that the diffuser be absent or removed (e.g., ground away) in selected regions 64 of the shell inner surface that correspond to the location of the individual LEDs in the mounting ring. That is, it is not necessary to diffuse the light emanating from the LEDs as required with a conventional incandescent light source. Thus in modifying a conventional lens, the regions 64 define a smooth transparent surface that protects the LED but does not diffuse the light emitted from the LED. It is contemplated that in a commercial version of the modified lens, the diffuser may be removed in its entirety or the regions 64 molded into the inner surface so that a separate grinding step is unnecessary.

The mounting ring 26, with lighting elements 24 attached, is secured inside the protective shell 22 such that the openings 32, 34 of the shell and ring are aligned. Likewise, if the lighting elements are the preferred LEDs, then the LEDs are aligned with the smooth regions in the shell. A backing plate, as used in a conventional clearance light assembly can close the open end of the shell once the mounting ring is inserted therein. Alternatively, use of a potting material to integrally secure and seal the mounting ring, LEDs, and lens may be sufficient to enclose the assembly and eliminate the use of a backing plate. The potting material prevents moisture or debris from contacting the lighting elements. Using a potting material impacts on the reflectivity offered by the reflector surface of the backing plate, although the use of LEDs as the light source may allow for elimination of the reflector surface. It is also important that the potting material not be permitted to engage or interfere with the lenticules provided on the inner surface of the shell.

The night vision device, such as an infrared camera, is then secured to the vehicle so that the camera lens is positioned to see through the shell/ring assembly. The night vision device sees through the aligned openings 32, 34 of the ring and the shell and faces forwardly of the truck cab in the same direction as the conventional clearance lights and the annular lighting element(s) of the modified night vision clearance lamp. Preferably, the night vision device is operated on a different circuit than the one used by the lighting elements. Thus, the night vision device can be turned on and off, i.e., operated independently, of whether the clearance lights are being used.

As will be appreciated from the above description, a protective shell from a standard clearance light can be used in this invention with little modification. A central opening is cut in the standard shell. Additionally, if non-diffuse regions are being used in the modified light, these regions must be created by removing the diffuser pattern or lenticules from the inner surface of the shell. Alternately, the non-diffuse regions may be cut out and replaced with small lenses. In addition, the aligned openings 32, 34 are closed with a transparent window or cover 70, such as an inexpensive silica, that provides protection for the more expensive camera lens. As will be appreciated, the window can be any suitable material that serves this protective function and does not adversely interfere with the operation of the night vision device. The window can also be specially contoured, or be formed as an integral or separate part of the shell.

In an alternate embodiment of the invention, the ends of the lighting elements project through the protective shell. While this reduces the protection afforded to the lighting elements, it further increases the lumens of the visible light emitted by the modified clearance light. The protective shell must be equipped with small openings (not shown) corresponding in number and position to the individual lighting elements that comprise the light source of the modified clearance light assembly.

The output from the night vision device is transmitted to the driver in the cab by any well-known conventional method. For example, the output may be transmitted via a cable (not shown) or wireless transmission to a video monitor (not shown) in the cab of the truck. Alternately, the output may be a heads up display (HUD).

As will be appreciated, a conventional clearance light assembly can be easily converted to a night vision clearance light. Particularly, a preferred method includes forming an annular shell from a standard shell. A mounting ring receives the new light source, here a series of light elements such as LEDs, and the ring with the light elements is secured to the annular shell. A potting material seals the mounting ring to the shell, although it is recognized that a potting material may be eliminated in some instances. An additional step in converting a shell may include removing a portion of a diff-using region along an inner surface of the shell if LEDs are used as the light source. The night vision device is oriented in the aligned openings of the mounting ring and annular shell. Moreover in selected circumstances, the opening in the annular shell may include a transparent window to protect the night vision device.

It will also be appreciated that rather than converting a conventional clearance shell, the night vision clearance light of the present invention can be assembled from its own specific components. For example, the annular shell may be specifically manufactured to accommodate the altered light source.

The invention has been described with reference to an illustrative embodiment. Obviously, modifications and alterations will occur to others upon a reading and understanding of the preceding detailed description. It is intended that the invention be construed as including all such alterations and modifications insofar as they come within the scope of the appended claims or the equivalents thereof.

What is claimed is:

1. A night vision clearance light assembly comprising:
   a shell transparent to visible light having an opening therethrough;
   a light source received in the shell for emitting light; and
   a night vision device directed through the opening in the shell.

2. The assembly of claim 1 further comprising a mounting ring and the light source is a plurality of visible light emitting elements secured to the mounting ring.

3. The assembly of claim 2 wherein the opening extends through a center of the mounting ring and the shell.

4. The assembly of claim 2, wherein the mounting ring contains a plurality of circumferentially spaced openings and wherein the light source includes individual light emitting elements secured in the mounting openings.

5. The assembly of claim 1 wherein the light source includes individual light emitting diodes.

6. The assembly of claim 5 wherein the lens includes a plurality of non-diffuse regions corresponding in number to light emitting diodes.

7. The assembly of claim 5 wherein the light emitting diodes are connected in a common electrical circuit.

8. The assembly of claim 1 further comprising a mounting ring having an opening aligned with the opening in the shell through which the night vision device sees.

9. The assembly of claim 1 wherein the visible light elements protrude through the top of the shell.

10. The assembly of claim 1 wherein the night vision device is adapted for operative connection with an associated infrared camera.

11. The assembly of claim 1 further comprising a potting compound for sealing the light source and shell.

12. A method for constructing an illumination system for use in motor vehicles comprising:
    securing a plurality of visible light emitting elements to a ring, the elements being interconnected to form a circuit;
    securing a shell over the rigid ring, the top of the shell being constructed such that light emitted from the visible light emitting elements is able to pass through the shell;
    placing a night vision device behind a central hole defined by the shell and the ring;
    inserting the assembly comprising the shell, the ring and the night vision device into a mounting hole in the exterior surface of a motor vehicle.

13. The method according to claim 12 wherein the mounting hole is a factory cut clearance light hole in the exterior of a truck cab.

14. The method according to claim 12 wherein the night vision device is secured to see through the shell and ring assembly after the assembly is inserted into the mounting hole.

* * * * *

UNITED STATES PATENT AND TRADEMARK OFFICE
CERTIFICATE OF CORRECTION

PATENT NO.    : 6,491,417 B1
DATED         : December 10, 2002
INVENTOR(S)   : Haehn et al.

It is certified that error appears in the above-identified patent and that said Letters Patent is hereby corrected as shown below:

<u>Title page,</u>
Item [75], Inventors, please delete the word "Haen" and insert -- Haehn --.
Item [73], Assignee, please delete the word "Elyair" and insert -- Elyria --.

Signed and Sealed this

Twenty-seventh Day of May, 2003

JAMES E. ROGAN
*Director of the United States Patent and Trademark Office*